United States Patent
Zhang et al.

(10) Patent No.: US 12,510,024 B2
(45) Date of Patent: *Dec. 30, 2025

(54) TURBINE ENGINE GAS-INLET COOLING SYSTEM AND TURBINE ENGINE APPARATUS

(71) Applicant: YANTAI JEREH PETROLEUM EQUIPMENT & TECHNOLOGIES CO., LTD., Shandong (CN)

(72) Inventors: Rikui Zhang, Shandong (CN); Xincheng Li, Shandong (CN); Peng Zhang, Shandong (CN); Zhijie Liu, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,240

(22) Filed: Jan. 9, 2024

(65) Prior Publication Data

US 2024/0183309 A1 Jun. 6, 2024

Related U.S. Application Data

(63) Continuation of application No. 17/745,396, filed on May 16, 2022, now Pat. No. 11,867,120.

(30) Foreign Application Priority Data

Feb. 16, 2022 (CN) .......................... 202220310150.2

(51) Int. Cl.
*F02C 6/18* (2006.01)
*E21B 43/26* (2006.01)
*F02C 7/12* (2006.01)

(52) U.S. Cl.
CPC ............ *F02C 6/18* (2013.01); *E21B 43/2607* (2020.05); *F02C 7/12* (2013.01); *F05D 2260/20* (2013.01)

(58) Field of Classification Search
CPC .... F02C 3/34; F02C 6/18; F02C 7/141; F02C 1/007; F02C 3/20; F02C 9/28; F02C 3/00;
(Continued)

(56) References Cited

U.S. PATENT DOCUMENTS 3,552,134 A * 1/1971 Arenson .................... F17C 9/04
62/272
3,720,057 A * 3/1973 Arenson .................... F17C 9/02
60/39.465
(Continued)

FOREIGN PATENT DOCUMENTS

CN 203655442 U 6/2014
CN 107100736 A 8/2017
(Continued)

*Primary Examiner* — Craig Kim
(74) *Attorney, Agent, or Firm* — Crowell & Moring LLP

(57) ABSTRACT

A turbine engine gas-inlet cooling system and a turbine engine apparatus are disclosed. The turbine engine includes a gas-inlet end and a gas-outlet end, and the turbine engine gas-inlet cooling system includes a gas-inlet cooling device. The gas-inlet cooling device includes a gas-input end and a gas-output end, and is configured to cool working gas being input from the gas-input end. The gas-output end is connected with the gas-inlet end of the turbine engine.

19 Claims, 4 Drawing Sheets

(58) Field of Classification Search
CPC ... Y02E 20/16; Y02E 20/18; F05D 2260/211; F05D 2260/61; F05D 2220/76; F05D 2270/303
See application file for complete search history.

(56) References Cited

U.S. PATENT DOCUMENTS

| | | | | |
|---|---|---|---|---|
| 3,978,663 | A * | 9/1976 | Mandrin | F02C 7/143 62/50.2 |
| 5,899,073 | A * | 5/1999 | Akimaru | F02C 9/42 60/734 |
| 6,899,146 | B2 | 5/2005 | Bingham | F17C 7/02 141/82 |
| 8,101,146 | B2 * | 1/2012 | Fedeyko | B01J 35/19 422/177 |
| 8,110,012 | B2 * | 2/2012 | Chiu | C10J 3/54 48/212 |
| 8,196,387 | B2 * | 6/2012 | Shah | F01K 23/068 60/39.464 |
| 8,528,335 | B2 * | 9/2013 | Bilton | F02C 7/224 60/39.5 |
| 8,539,749 | B1 * | 9/2013 | Wichmann | F02C 3/34 60/39.52 |
| 8,627,643 | B2 * | 1/2014 | Chillar | F02C 9/28 60/803 |
| 9,732,673 | B2 * | 8/2017 | Denton | F02C 3/34 |
| 10,273,880 | B2 * | 4/2019 | Kolvick | F02C 7/141 |
| 10,865,631 | B1 * | 12/2020 | Zhang | F04B 17/03 |
| 11,359,518 | B2 * | 6/2022 | Jang | F02C 6/18 |
| 11,560,779 | B2 * | 1/2023 | Mao | F01D 21/006 |
| 11,575,249 | B2 * | 2/2023 | Ji | H02G 1/06 |
| 11,584,539 | B2 * | 2/2023 | Ullyott | F02C 9/18 |
| 2011/0162278 | A1 * | 7/2011 | DePuy | C10K 1/02 422/165 |
| 2012/0023966 | A1 * | 2/2012 | Ouellet | F02C 3/36 60/778 |
| 2012/0031581 | A1 * | 2/2012 | Chillar | G01J 5/0896 361/103 |
| 2012/0144837 | A1 * | 6/2012 | Rasmussen | F25J 3/04533 60/39.19 |
| 2012/0247105 | A1 * | 10/2012 | Nelson | F01K 23/068 60/698 |
| 2013/0086917 | A1 * | 4/2013 | Slobodyanskiy | F23R 3/10 60/773 |
| 2013/0091853 | A1 * | 4/2013 | Denton | F02C 1/007 60/39.52 |
| 2013/0232980 | A1 * | 9/2013 | Chen | F23R 3/045 60/754 |
| 2013/0269310 | A1 * | 10/2013 | Wichmann | F02C 3/34 60/726 |
| 2013/0269356 | A1 * | 10/2013 | Butkiewicz | F02C 3/34 60/39.181 |
| 2013/0269360 | A1 * | 10/2013 | Wichmann | F02C 6/18 60/773 |
| 2013/0269361 | A1 * | 10/2013 | Wichmann | F02C 3/34 60/773 |
| 2013/0283808 | A1 * | 10/2013 | Kolvick | F02C 7/18 60/39.52 |
| 2014/0000271 | A1 * | 1/2014 | Mittricker | F02C 7/141 60/726 |
| 2014/0000273 | A1 * | 1/2014 | Mittricker | F02C 3/34 60/773 |
| 2014/0007590 | A1 * | 1/2014 | Huntington | F02C 3/04 60/801 |
| 2014/0013766 | A1 * | 1/2014 | Mittricker | F01N 5/02 60/783 |
| 2014/0020398 | A1 * | 1/2014 | Mittricker | F02C 7/141 60/39.52 |
| 2014/0047818 | A1 * | 2/2014 | Oelkfe | F02C 3/34 60/274 |
| 2018/0340453 | A1 * | 11/2018 | Jang | F02C 6/18 |
| 2019/0055887 | A1 * | 2/2019 | Giancotti | F25J 1/0022 |
| 2020/0386473 | A1 * | 12/2020 | Becker | F25J 1/005 |
| 2021/0215099 | A1 | 7/2021 | Yeung et al. | |

FOREIGN PATENT DOCUMENTS

| | | |
|---|---|---|
| CN | 208749447 U | 4/2019 |
| CN | 213478498 U | 6/2021 |
| CN | 215595733 U * | 1/2022 |

* cited by examiner

TURBINE ENGINE GAS-INLET COOLING SYSTEM AND TURBINE ENGINE APPARATUS

The application is a continuation of and claims the benefit of priority to U.S. patent application Ser. No. 17/745,396, filed on May 16, 2022, and issued as U.S. Pat. No. 11,867,120, which is based on and claims priority to the Chinese patent application No. 202220310150.2, filed on Feb. 16, 2022, the entire disclosure of which is incorporated herein by reference as part of the present application.

TECHNICAL FIELD

Embodiment of the present disclosure relate to a turbine engine gas-inlet cooling system and a turbine engine apparatus.

BACKGROUND

The application of a fracturing apparatus with turbine engine as power source in oil field is gradually expanding. The output power of the turbine engine is greatly affected by ambient temperature because a gas turbine is a fixed-volume apparatus. When the density of working air decreases and the specific volume for a unit amount of working air increases in high temperature weather, the inlet mass flow rate of the gas turbine reduces, resulting in a power decline. For example, for some turbine engines, for every 1° C. increase of intake air temperature, the power loss of the gas turbine is about 1%, and this characteristic of the turbine engine limits the applicability of the working environment thereof.

SUMMARY

At least one embodiment of the present disclosure provides a turbine engine gas-inlet cooling system, the turbine engine has a gas-inlet end and a gas-outlet end, and the turbine engine gas-inlet cooling system includes a gas-inlet cooling device, the gas-inlet cooling device includes a gas-input end and a gas-output end, and is configured to cool working gas being input from the gas-input end, and the gas-output end of the gas-inlet cooling device is connected with the gas-inlet end of the turbine engine.

For example, the turbine engine gas-inlet cooling system provided by at least one embodiment of the present disclosure further comprises an exhaust gas recovery device and a refrigeration device; the exhaust gas recovery device comprises a gas-input end and a gas-output end, the gas-outlet end of the turbine engine is directly connected to the gas-input end of the exhaust gas recovery device; the refrigeration device comprises a heat source gas input end, a first liquid input end and a refrigeration liquid output end, the gas-output end of the exhaust gas recovery device is directly connected to the heat source gas input end, and the refrigeration device is configured to use heat from the exhaust gas to perform refrigeration through a heat exchange process; the gas-inlet cooling device comprising a gas-liquid heat exchange device, and the gas-liquid heat exchange device comprises a gas-inlet end, a gas-outlet end and a liquid-inlet end, the liquid-inlet end is connected to the refrigeration liquid output end of the refrigeration device, the gas-inlet end of the gas-liquid heat exchange device serves as the gas-input end of the gas-inlet cooling device, and the working gas being input through the gas-inlet end of the gas-liquid heat exchange device exchanges heat with working liquid input from the liquid-inlet end of the gas-liquid heat exchange device in the gas-liquid heat exchange device, and the gas-outlet end of the gas-liquid heat exchange device serves as the gas-output end of the gas-inlet cooling device to be connected with the gas-inlet end of the turbine engine.

For example, the turbine engine gas-inlet cooling system provided by at least one embodiment of the present disclosure further comprises a first gas transmission pipeline and a second gas transmission pipeline; the first gas transmission pipeline directly connects the gas-outlet end of turbine engine with the gas-inlet end of the exhaust gas recovery device; the second gas transmission pipeline directly connects the gas-output end of the exhaust gas recovery device with the heat source gas input end of the refrigeration device.

For example, in the turbine engine gas-inlet cooling system provided by at least one embodiment of the present disclosure, the refrigeration device is a lithium bromide refrigerator, the lithium bromide refrigerator comprises a generator and a heat source gas transmission pipeline, and the generator is provided with lithium bromide solution, and the heat source gas transmission pipeline connects the heat source gas input end with the generator.

For example, in the turbine engine gas-inlet cooling system provided by at least one embodiment of the present disclosure, the gas-liquid heat exchange device further comprises a liquid-output end, and the liquid-output end of the gas-liquid heat exchange device is connected with the first liquid input end of the refrigeration device.

For example, in the turbine engine gas-inlet cooling system provided by at least one embodiment of the present disclosure, the turbine engine gas-inlet cooling system further comprises a first filter device, the first filter device is connected between the gas-outlet end of the gas-liquid heat exchange device and the gas-inlet end of the turbine engine, and is configured to filter the working gas discharged from the gas-liquid heat exchange device.

For example, in the turbine engine gas-inlet cooling system provided by at least one embodiment of the present disclosure, the turbine engine gas-inlet cooling system further comprises a second filter device, the second filter device is connected between the first filter device and the gas-inlet end of the turbine engine, and configured to filter the working gas discharged from the first filter device.

For example, in the turbine engine gas-inlet cooling system provided by at least one embodiment of the present disclosure, filtering precision of the second filter device is higher than that of the first filter device, purity of the working gas after passing through the second filter device is higher than that of the working gas after passing through the first filter device.

For example, in the turbine engine gas-inlet cooling system provided by at least one embodiment of the present disclosure, the turbine engine comprises a muffler, the muffler is at the gas-outlet end of the turbine engine and configured to reduce noise generated by the exhaust gas of the turbine engine, and the exhaust gas recovery device is set at the muffler.

For example, in the turbine engine gas-inlet cooling system provided by at least one embodiment of the present disclosure, the turbine engine comprises a working chamber and a gas-inlet chamber; the gas-inlet chamber comprises the gas-inlet end of the turbine engine and is connected to the working chamber, the gas-liquid heat exchange device is arranged on the gas-inlet chamber, and the gas-outlet end of the gas-liquid heat exchange device is connected to the gas-inlet chamber.

For example, in the turbine engine gas-inlet cooling system provided by at least one embodiment of the present disclosure, the gas-liquid heat exchange device is arranged on a top of the gas-inlet chamber away from ground.

For example, in the turbine engine gas-inlet cooling system provided by at least one embodiment of the present disclosure, the working chamber of the turbine engine comprises an air compressor and a combustion chamber; the air compressor is connected to the gas-inlet chamber; and the combustion chamber is connected to the air compressor.

For example, in the turbine engine gas-inlet cooling system provided by at least one embodiment of the present disclosure, the gas-inlet cooling device further comprises a liquid-inlet end and comprises a cooling chamber, an atomizer device and a liquid supply pipeline; the working gas enters the cooling chamber through the gas-inlet end; the atomizer device is connected with the cooling chamber; and the liquid supply pipeline is connected with the atomizer device, and is configured to transport liquid to the atomizer device; the atomizer device is configured to atomize the liquid and allow a atomized product to enter the cooling chamber.

For example, the turbine engine gas-inlet cooling system provided by at least one embodiment of the present disclosure further comprises a liquefied natural gas gasification device, a gasification pipeline, and a cooling liquid transmission pipeline; the liquefied natural gas gasification device is configured to gasify liquefied natural gas; the gasification pipeline is connected to the liquefied natural gas gasification device; and the cooling liquid transmission pipeline is connected to the gasification pipeline; the liquefied natural gas is gasified to cool the working liquid in the cooling liquid transmission pipeline, the gas-inlet cooling device comprises a gas-liquid heat exchange device, and the gas-liquid heat exchange device comprises a gas-inlet end, a gas-outlet end and a liquid-inlet end, and the gas-inlet end is connected to the cooling liquid transmission pipeline, and the gas-inlet end of gas-liquid heat exchange device serves as the gas-input end of the gas-inlet cooling device, the working gas being input into the gas-liquid heat exchange device through the gas-inlet end of the gas-liquid heat exchange device and the working liquid input into the gas-liquid heat exchange device through the liquid-inlet end of the gas-liquid heat exchange device conduct heat exchange in the gas-liquid heat exchange device, and, the gas-outlet end of the gas-liquid heat exchange device serves as the gas-output end of the gas-inlet cooling device to be connected to the gas-inlet end of the turbine engine.

For example, the turbine engine gas-inlet cooling system provided by at least one embodiment of the present disclosure further comprises a temperature control system configured to regulate a temperature of the working gas after heat exchange in the cooling chamber.

For example, the turbine engine gas-inlet cooling system provided by at least one embodiment of the present disclosure further comprises a temperature control system configured to regulate a temperature of the working gas after heat exchange in the gas-liquid heat exchange device.

For example, in the turbine engine gas-inlet cooling system provided by at least one embodiment of the present disclosure, after the working gas exchanges heat with the refrigeration liquid in the gas-liquid heat exchange device to the actual temperature, the temperature of the working gas decreases by at least 20° C.

For example, in the turbine engine gas-inlet cooling system provided by at least one embodiment of the present disclosure, the temperature of the working gas being input to the gas-inlet end of the gas-liquid heat exchange device ranges from 30° ° C. to 40° C., and the temperature of the working gas discharged from the gas-outlet end of the gas-liquid heat exchange device ranges from 10° C. to 18° C.

For example, the turbine engine gas-inlet cooling system provided by at least one embodiment of the present disclosure further comprises a liquid separator, the liquid separator is configured to remove at least part of liquid in the working gas cooled by heat exchange in the gas-liquid heat exchange device.

At least one embodiment of the present disclosure further provides a turbine engine apparatus, the turbine engine apparatus comprises any one of the turbine engine gas-inlet cooling systems provided by embodiments of the present disclosure, the gas-inlet end and the gas-outlet end.

For example, in the turbine engine apparatus provided by at least one embodiment of the present disclosure, the turbine engine apparatus comprises a main carrier, and the gas-inlet cooling device is arranged on the main carrier.

For example, in the turbine engine apparatus provided by at least one embodiment of the present disclosure, the turbine engine apparatus is a turbine fracturing apparatus or a turbine power generation apparatus.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "Inside," "outside" "on," "under," and the like are only used to indicate relative position relationship, and when the position of the object which is described is changed, the relative position relationship may be changed accordingly.

The dimensions of the drawings used in the present disclosure are not drawn strictly according to the actual scale, and the specific dimensions of each structure can be determined according to actual needs.

The problem of turbine engine power loss because of excessive air temperature can be improved by an air-inlet cooling process of the turbine engine. The gas-inlet cooling technology of the turbine engine has been applied to the products of the gas turbine generator group.

At least one embodiment of the present disclosure provides a turbine engine gas-inlet cooling system, the turbine engine has a gas-inlet end and a gas-outlet end, and the turbine engine gas-inlet cooling system includes a gas-inlet cooling device, the gas-inlet cooling device includes a gas-input end and a gas-output end, and is configured to cool working gas being input from the gas-input end, and the gas-output end of the gas-inlet cooling device is connected with the gas-inlet end of the turbine engine.

Figure 1:
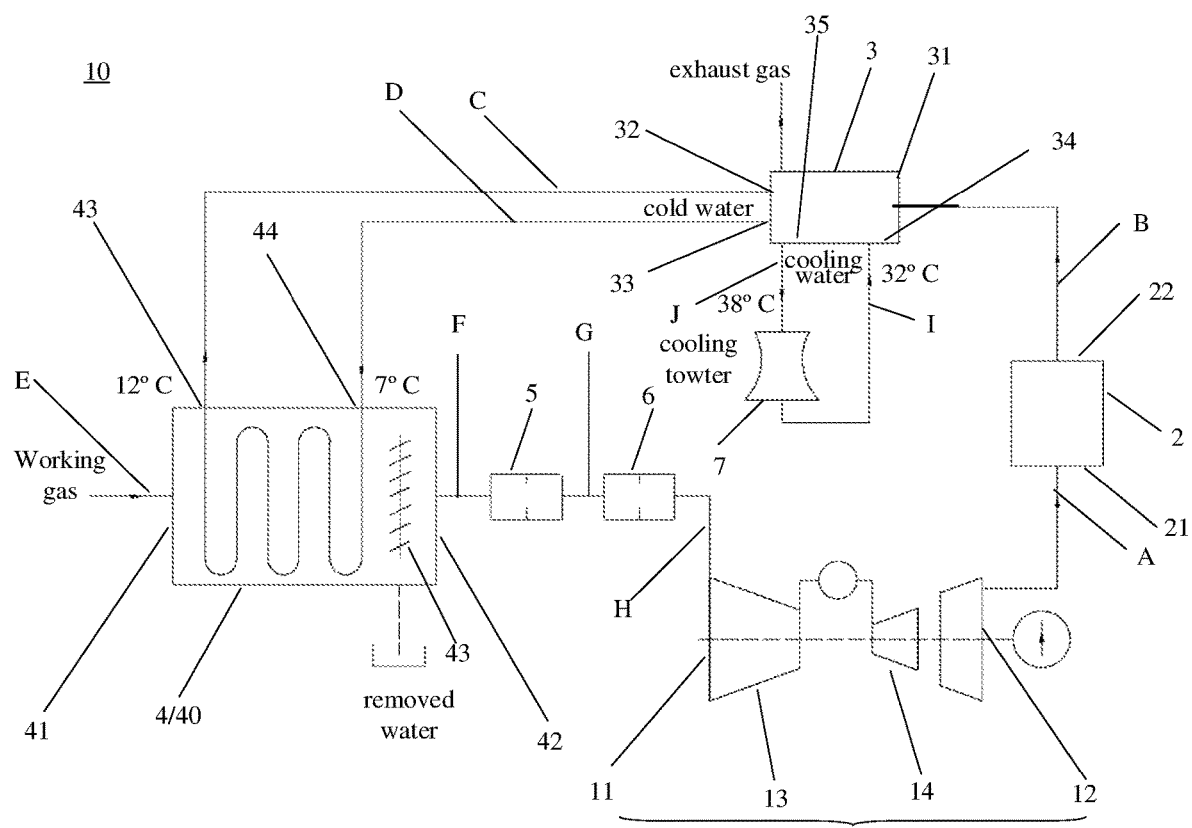
FIG. 1 is a schematic diagram of a turbine engine gas-inlet cooling system provided by an embodiment of the present disclosure.

Exemplarily, FIG. 1 is a schematic diagram of a turbine engine gas-inlet cooling system provided by an embodiment of the present disclosure. As illustrated in FIG. 1, the turbine engine 1 has a gas-inlet end 11 and a gas-outlet end 12, and the turbine engine gas-inlet cooling system 10 includes an exhaust gas recovery device 2 and a refrigeration device 3. The gas-inlet cooling device includes a gas-liquid heat exchange device 4. The exhaust gas recovery device 2 includes a gas-input end 21 and a gas-output end 22, and the gas-outlet end 12 of the turbine engine 1 is directly connected to the gas-input end 21 of the exhaust gas recovery device 2. The refrigeration device 3 comprises a heat source gas input end 31, a first liquid input end 32 and a refrigeration liquid output end 33. The gas-output end 22 of the exhaust gas recovery device 2 is directly connected to the heat source gas input end 31 of the refrigeration device 3, and the refrigeration device 3 is configured to utilize the heat from the exhaust gas to perform refrigeration through a heat exchange process, and the heat exchange process includes gas-liquid heat exchange, such as evaporation, liquefaction, and other processes. The gas-liquid heat exchange device 4 includes a gas-inlet end, a gas-outlet end and a liquid-inlet end, the liquid-inlet end is connected to the refrigeration liquid output end 33 of the refrigeration device 3, and the working gas being input into the gas-liquid heat exchange device 4 through the gas-inlet end 41 of the gas-liquid heat exchange device 4 exchanges heat with the working liquid input into the gas-liquid heat exchange device 4 through the liquid-inlet end 44 of the gas-liquid heat exchange device 4 in the gas-liquid heat exchange device 4, and, the gas-outlet end 42 of the gas-liquid heat exchange device 4 is connected with the gas-inlet end 11 of the turbine engine 1. That is, the gas-inlet cooling device includes a gas-liquid heat exchange device, and the gas-liquid heat exchange device includes a gas-inlet end, a gas-outlet end and a liquid-inlet end, the liquid-inlet end is connected to the refrigeration liquid output end of the refrigeration device, the gas-inlet end of the gas-liquid heat exchange device serves as the gas-input end of the gas-inlet cooling device, and the working gas being input through the gas-inlet end of the gas-liquid heat exchange device exchanges heat with the working liquid input from the liquid-inlet end of the gas-liquid heat exchange device in the gas-liquid heat exchange device, and, the gas-outlet end of the gas-liquid heat exchange device serves as the gas-output end of the gas-inlet cooling device, and is connected with the gas-inlet end of the turbine engine. After the fuel is burned in the combustion chamber of the turbine engine, a large amount of high-temperature exhaust gas is produced. The fuel efficiency of the turbine engine is low, about 13%~30.3%. The heat of the exhaust gas of the turbine engine is very high, and if the heat of the exhaust gas is not used, the waste heat of the exhaust gas of the turbine engine will be seriously wasted. The turbine engine gas-inlet cooling system 10 provided by the embodiments of the present disclosure directly uses the heat of the exhaust gas output from the turbine engine 1 as the heat source of the refrigeration device 2 to generate low-temperature refrigeration liquid, and directly uses the low-temperature refrigeration liquid generated by the refrigeration device 2 to cool the working gas being input into the gas-inlet end 11 of the turbine engine 1, so as to improve the heat utilization efficiency of the exhaust gas and the cooling effect on the working gas. The heat of the exhaust gas output from the turbine engine is fully utilized to improve the problem that the power of the turbine engine is reduced because of the high air temperature, thereby saving energy, and, the gas-inlet cooling system 10 of the turbine engine is easy to be integrated on the vehicle turbine engine apparatus, and can also be set in a workshop, the scope of application of the gas-inlet cooling process of the turbine engine has been expanded.

It should be noted that the description "the gas-outlet end 12 of the turbine engine 1 is directly connected to the gas-input end 21 of the exhaust gas recovery device 2" means that the high-temperature exhaust gas discharged from the gas-outlet end 12 of the turbine engine 1 directly enters the gas-input end 21 of the exhaust gas recovery device 2; for example, no device is provided between the gas-outlet end 12 of the turbine engine 1 and the gas-input end 21 of the exhaust gas recovery device 2, and the high-temperature exhaust gas discharged from the gas-outlet end 12 of the turbine engine 1 does not pass through any other structure, but directly enter the gas-input end 21 of the exhaust gas recovery device 2 from the gas-outlet end 12, so as to enter the exhaust gas recovery device 2, or, no other device or structure is arranged between the gas-outlet end 12 of turbine engine 1 and the gas-input end 21 of the exhaust gas recovery device 2 except the exhaust gas transmission device of turbine engine 1, such as gas transmission pipeline (for example, the first gas transmission pipeline A below), and no other power devices that can do work are arranged between the gas-outlet end 12 of turbine engine 1 and the gas-input end 21 of the exhaust gas recovery device 2, and these power devices include, but are not limited to, devices that require a heat source, such as gas turbines, in this way, the high-temperature exhaust gas discharged from the gas-outlet end 12 of the turbine engine 1 enters the gas-input end 21 of the exhaust gas recovery device 2 only passes through the exhaust gas conveying device such as the gas transmission pipeline, thereby entering the exhaust gas recovery device 2. The description "the gas-output end 22 of the exhaust gas recovery device 2 is directly connected to the heat source gas input end 31 of the refrigeration device 3" means that the high-temperature exhaust gas in the exhaust gas recovery device 2 directly enters the heat source gas input end 31 of the refrigeration device 3; for example, no device is provided between the gas-output end 22 of the exhaust gas recovery device 2 and the heat source gas input end 31 of the refrigeration device 3, the high-temperature exhaust gas in the exhaust gas recovery device 2 does not pass through any other structure, but directly passes through the heat source gas input end 31 of the refrigeration device 3 to enter the exhaust gas recovery device 2, or, no other equipment is arranged between the gas-output end 22 of the exhaust gas recovery device 2 and the heat source gas input end 31 of the refrigeration device 3 except the exhaust gas transmission device such as gas transmission pipeline (for example, the second gas transmission pipeline B below), and no other power devices that can do work are arranged between the gas-output end 22 of the exhaust gas recovery device 2 and the heat source gas input end 31 of the refrigeration device 3, and these power devices include, but are not limited to, devices that require a heat source, such as gas turbines, in this way, the high-temperature exhaust gas discharged from the gas-output end 22 of the exhaust gas recovery device 2 only passes through the exhaust gas conveying device such as the gas transmission pipeline to enters the heat source gas input end 31 of the refrigeration device 3, thereby entering the refrigeration device 3. In this way, the heat of the exhaust gas discharged from the turbine engine 1 can be directly used as a heat source of the refrigeration device 32 to generate a low-temperature refrigeration liquid, thereby improving the heat utilization efficiency of the exhaust gas and the cooling effect on the working gas.

For example, as illustrated in FIG. 1, the gas-inlet cooling system 10 of the turbine engine further comprises a first gas transmission pipeline A and a second gas transmission pipeline B. The first gas transmission pipeline A directly connects the gas-outlet end 12 of turbine engine 1 with the gas-inlet end 21 of the exhaust gas recovery device 2; the second gas transmission pipeline B directly connects the gas-output end 22 of the exhaust gas recovery device 2 with the heat source gas input end 31 of the refrigeration device 3. That is, no other device is arranged between the gas-outlet end 12 of the turbine engine 1 and the gas-input end 21 of the exhaust gas recovery device 2 except the first gas transmission pipeline A, and no other power devices that can do work are arranged between the gas-outlet end 12 of the turbine engine 1 and the gas-input end 21 of the exhaust gas recovery device 2, these power devices include but are not limited to the gas turbine and other device requiring a heat source. In this way, the high-temperature exhaust gas discharged from the gas-outlet end 12 of the turbine engine 1 only passes through the first gas transmission pipeline A to enter the gas-input end 21 of the exhaust gas recovery device 2, so as to enter the exhaust gas recovery device 2; no other device is arranged between the gas-output end 22 of the exhaust gas recovery device 2 and heat source gas input end 31 of the refrigeration device 3 except the second gas transmission pipeline B, for example, no other power devices are arranged between the gas-output end 22 of the exhaust gas recovery device 2 and heat source gas input end 31 of the refrigeration device 3, these power devices include but are not limited to the gas turbine and other devices requiring heat source. In this way, the high-temperature exhaust gas discharged from the gas-output end 22 of the exhaust gas recovery device 2 only passes through the second gas transmission pipeline B to enter the heat source gas input end 31 of the refrigeration device 3, so as to enter the refrigeration device 3.

Alternatively, in at least one other embodiment, the exhaust gas recovery device 2 may be a gas-exhaust recovery pipeline, and gas-exhaust recovery pipeline directly connects the gas-output end 22 of the exhaust gas recovery device 2 with the heat source gas input end 31 of the refrigeration device 3, the high-temperature exhaust gas discharged from the gas-outlet end 12 of the turbine engine 1 only passes through the gas-exhaust recovery pipeline to enter the gas-input end 21 of the exhaust gas recovery device 2, so as to enter the exhaust gas recovery device 2.

For example, the working gas is air, or may comprise other gases that can be used as fuel for a turbine engine.

As illustrated in FIG. 1, a gas transmission pipeline E is connected to the gas-inlet end 41 of the gas-liquid heat exchange device 4, and the working gas enters the gas-inlet end 41 of the gas-liquid heat exchange device 4 through the gas transmission pipeline E, thereby entering the gas-liquid heat exchange device 4.

Figure 2:
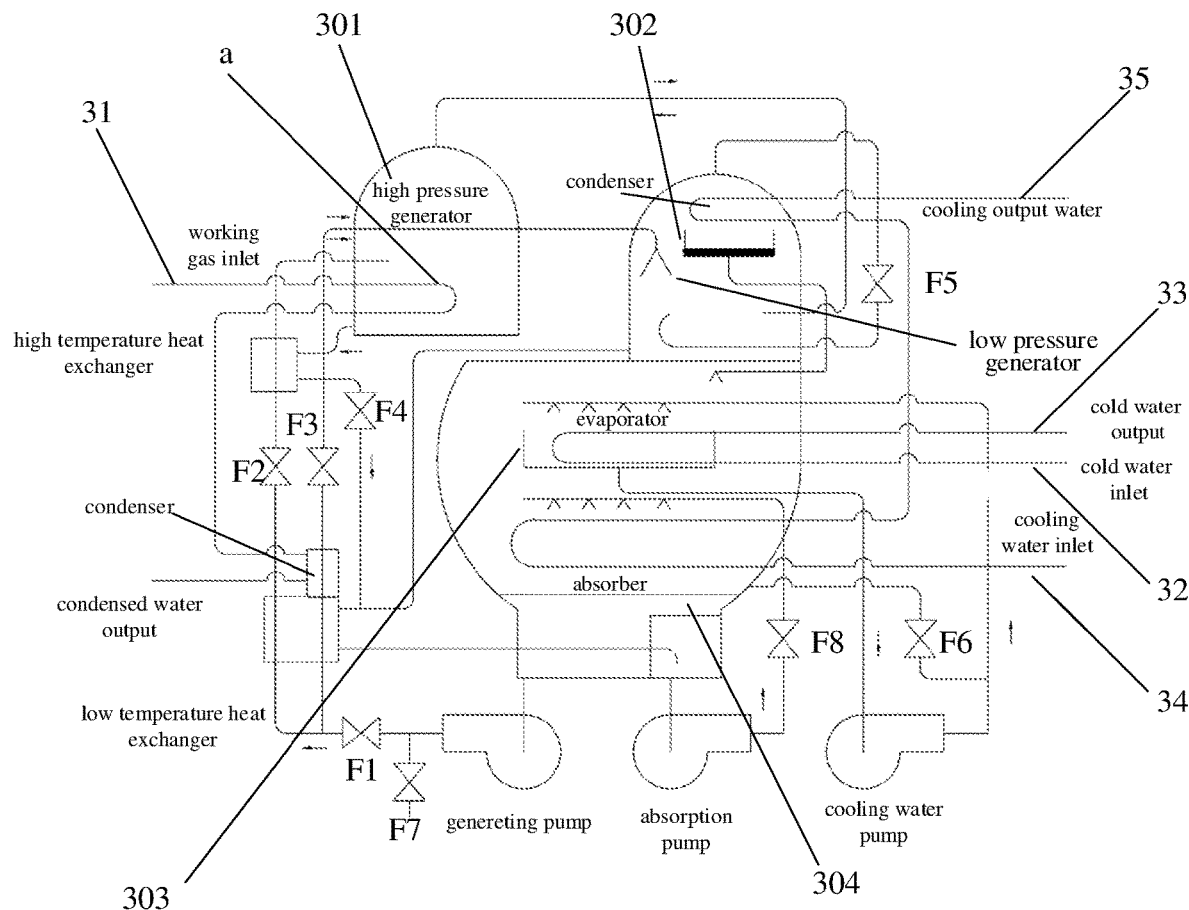
FIG. 2 is a schematic diagram of a refrigeration device of a turbine engine gas-inlet cooling system provided by an embodiment of the present disclosure.

For example, the refrigeration device 3 is a lithium bromide refrigerator. FIG. 2 is a schematic diagram of a refrigeration device of a turbine engine gas-inlet cooling system provided by an embodiment of the present disclosure. As illustrated in FIG. 2, the lithium bromide refrigerator comprises a generator 301 and a heat source gas transmission pipeline a. The generator 301 is provided with lithium bromide solution for example lithium bromide aqueous solution, and the heat source gas transmission pipeline a connects the heat source gas input end 31 and the generator 301.

For example, the generator 301 is a high-pressure generator. The high temperature exhaust gas of the turbine engine 1 enters the lithium bromide refrigerator through the heat source gas input end 31, and then enters the high-pressure generator 301 through the heat source gas transmission pipeline a. The lithium bromide aqueous solution is heated to boiling in the high-pressure generator 301 by the high-temperature exhaust gas of the turbine engine 1 (for example, heated to 140° C.), that is, the high-temperature exhaust gas of the turbine engine 1 is used as a heat source for heating the lithium bromide aqueous solution.

The lithium bromide refrigerator further comprises a condenser 302, an evaporator 303, an absorber 304, a cooling water input end 34 and a cooling water output end 35. The water vapor generated by the high-pressure generator 301 enters the condenser 302, and is condensed into water by cooling inlet water, and then the condensed water flows into the evaporator 303 through a U-shaped pipeline, and a first liquid, for example, chilled water enters the evaporator through the first liquid input end 32, the chilled water vaporizes and absorbs heat in the high vacuum environment in the evaporator 303, so that the first liquid flowing through the evaporator 303 is cooled and a refrigeration liquid is obtained, and the refrigeration liquid is discharged from the lithium bromide refrigerator through the refrigeration liquid output end 33. The concentrated lithium bromide solution in the high-pressure generator 301 is pre-cooled by the solution heat exchanger, and then enters the absorber 304 to absorb the water vapor which is from the evaporator 303, releasing dissolution heat, and the released dissolution heat is carried away by cooling output water entering the absorber 304 through the cooling water input end 34, and the cooling output water is output through the cooling water output end 35. After the lithium bromide solution is restored to the original concentration, the lithium bromide solution is reheated in the generator, and it is continuously circulated in this way to achieve the cooling effect, and the refrigeration liquid is produced in the cycle.

As illustrated in FIG. 1, the 12° C. return water is continuously cooled to 7° C. in the lithium bromide refrigerator. For example, the turbine engine gas-inlet cooling system further comprises a cooling tower 7, the cooling water input end of the cooling tower 7 is connected to the cooling water output end 35 of the lithium bromide refrigerator, and the cooling output water is output to the cooling water input end of the cooling tower 7 through the cooling water output end 35 of the cooling tower 7, thereby entering the cooling tower 7, the heat of the cooling output water is dissipated to the atmosphere through the cooling tower, and the generated cooling inlet water with a lower temperature enters the absorber 304 through the cooling water input end 34, thus forming a cooling water circulation system. The cooling water circulation system further comprises a pump system for conveying the cooling output water and the cooling inlet water, and the pump system may include one pump for use and one pump for standby. If the reliability of the pump is high, in order to save space, the pump system may be set as a single pump configuration. Of course, the structure of the above-mentioned lithium bromide refrigerator is only exemplary, and the features not mentioned can be realized by referring to the conventional technology in the art, or, other types of lithium bromide refrigerator may be adopted.

With reference to FIG. 1, the refrigeration liquid discharged from the lithium bromide refrigerator enters the gas-liquid heat exchange device 4 through the liquid-input end of the gas-liquid heat exchange device 4, for example, liquid transmission pipeline D connects the refrigeration liquid output end 33 with the liquid-input end 44 of the gas-liquid heat exchange device 4, and the refrigeration liquid discharged from the refrigeration liquid output end 33 enters the gas-liquid heat exchange device 4 through the liquid transmission pipeline D, and the refrigeration liquid is used as the working liquid for heat exchange with the working gas in the gas-liquid heat exchange device 4.

For example, as illustrated in FIG. 1, the gas-liquid heat exchange device 4 further comprises a liquid-output end 43, and the liquid-output end 43 of the gas-liquid heat exchange device 4 is connected with the first liquid input end 32 of the refrigeration device 3, and the refrigeration liquid is discharged from the liquid-output end 43 of the gas-liquid heat exchange device 4 after a heat exchange with the working gas in the gas-liquid heat exchange device 4, then it is transported to the first liquid input end 32 and then enters the refrigeration device 3, so as to recycle the refrigeration liquid, save water consumption, save resources and improve the resource utilization rate. For example, a liquid transmission pipeline C connects the liquid-output end 43 of the gas-liquid heat exchange device 4 with the first liquid input end 32, and the refrigeration liquid discharged from the liquid-output end 43 of the gas-liquid heat exchange device 4 enters the refrigeration device 3 through the liquid transmission pipeline C.

For example, the temperature of the working gas after the heat exchange with the refrigeration liquid in the gas-liquid heat exchange device 4 is adjustable. For example, the turbine engine gas-inlet cooling system 10 comprises a temperature control system, and the temperature control system is configured to regulate the temperature of the working gas after the heat exchange in the gas-liquid heat exchange device. For example, a target temperature may be set in the temperature control system, and the temperature control system is configured to obtain an actual temperature of the working gas after the heat exchange with the refrigeration liquid in the gas-liquid heat exchange device 4, and the actual temperature is compared with the target temperature; in the case where the actual temperature reaches the target temperature, the temperature control system controls the working gas to be output from the gas-liquid heat exchange device 4 to supply the working gas to the turbine engine; in the case where the actual temperature does not reach the target temperature, the temperature control system controls and adjusts the parameters of the refrigeration device such as the lithium bromide refrigerator, for example, adjusts the temperature of the refrigeration liquid, so as to adjust the actual temperature of the working gas after the heat exchange with the refrigeration liquid in the gas-liquid heat exchange device 4. Of course, the above parameters may also be manually adjusted. Methods for adjusting the actual temperature of the working gas after the heat exchange with the refrigeration liquid in the gas-liquid heat exchange device 4 are not limited to the above method, and are not limited in this disclosure, and those skilled in the art can design according to the actual situation.

For example, after the working gas exchanges heat with the refrigeration liquid in the gas-liquid heat exchange device 4 to the actual temperature, the temperature of the working gas decreases by at least 20° ° C. For example, the temperature of the working gas being input to the gas-inlet end of the gas-liquid heat exchange device 4 ranges from 30° C. to 40° C., and the temperature of the working gas discharged from the gas-outlet end 42 of the gas-liquid heat exchange device 4 ranges from 10° C. to 18° C.

For example, as illustrated in FIG. 1, the turbine engine gas-inlet cooling system 10 further comprises a liquid separator 44, and the liquid separator 44 is configured to remove at least part of liquid in the working gas cooled by the heat exchange in the gas-liquid heat exchange device 4, so as to improve the dryness of the working gas. For example, the liquid separator 44 is a water separator configured to remove at least part of water in the working gas cooled by the heat exchange in the gas-liquid heat exchange device 4. Because in the process of the gas-liquid heat exchange, the temperature of the working gas decreases, and the water vapor in the working gas changes from a gaseous state to a liquid state, but the working gas that is finally supplied to the wheel engine is required to be neat, clean, dry, and low-temperature air, therefore using the separator 44 to remove the water in the working gas can ensure the dryness of the working gas used by the turbine engine, thereby better meeting the requirements of the turbine engine for the working gas and improving the combustion efficiency of the fuel in the turbine engine. For example, the gas-liquid heat exchange device 4 comprises a heat exchange chamber 40, the working gas is transported into the heat exchange chamber 40 for heat exchange, and the liquid separator 44 is arranged in the heat exchange chamber 40, for example, the liquid separator 44 absorbs at least part of the water from the working gas entering the heat exchange chamber 40 and drains it out of the heat exchange chamber 40 to effectively increase the dryness of the working gas in the gas-liquid heat exchange device 4 in real time.

For example, as illustrated in FIG. 1, the turbine engine gas-inlet cooling system 10 further comprises a first filter device 5, and the first filter device 5 is connected between the gas-outlet end of the gas-liquid heat exchange device 4 and the gas-inlet end 11 of the turbine engine 1, and the first filter device 5 is configured to filter the working gas discharged from the gas-liquid heat exchange device 4. Filter impurities in the working gas such as solid particles, the solid particles include, for example, silica dust, dust, dry powder, incomplete combustion fuel or hydrocarbon particles, other chemicals used in petroleum industry, etc., and the impurities in the gas may further include other undesirable gas, liquid, etc., to improve the purity of the working gas, make the working gas better meet the requirements, reduce the damage to the turbine engine 1 caused by these filtered substances in the case where the turbine engine 1 is used for a long time, and improve the combustion efficiency of the working gas.

For example, a gas pipeline F is connected with the gas-outlet end 42 of the gas-liquid heat exchange device 4 and the gas-inlet end of the first filter device 5, and the working gas discharged from the gas-liquid heat exchange device 4 enters the first filter device 5 through the gas pipeline F.

For example, as illustrated in FIG. 1, the turbine engine gas-inlet cooling system 10 further comprises a second filter device 6, and the second filter device 6 is connected between the first filter device 5 and the gas-inlet end 11 of the turbine engine 1, and is configured to filter the working gas discharged from the first filter device 5. For example, to further filter impurities in the working gas such as solid particles, the solid particles include, for example, silica dust, dust, dry powder, incomplete combustion fuel or hydrocarbon particles, other chemicals used in petroleum industry, etc., and the impurities in the gas may further include other undesirable gas, liquid, etc., to improve the purity of the working gas, make the working gas better meet the requirements, reduce the damage to the turbine engine 1 caused by these filtered substances in the case where the turbine engine 1 is used for a long time, and improve the combustion efficiency of the working gas.

For example, a gas pipeline G connects the gas-outlet end of the first filter device 5 and the gas-inlet end of the second filter device 6, and the working gas discharged from the first filter device 5 enters the second filter device 6 through the gas pipeline G. The purity of the working gas after passing through the second filter device 6 is higher than that of the working gas after passing through the first filter device 5.

It should be noted that the term "purity of the working gas" here refers to the content of the portion other than the above-mentioned impurities in the working gas.

For example, the filtering precision of the second filter device 6 is higher than that of the first filter device 5.

In the embodiment illustrated in FIG. 1, the first filter device 5 and the second filter device 6 are connected in series. Of course, in other embodiments, the turbine engine gas-inlet cooling system may not include the first filter device 5 and the second filter device 6, or include only one selected from a group consisting of the first filter device 5 and the second filter device 6, or include more than 2 filter devices connected in series.

Figure 3:
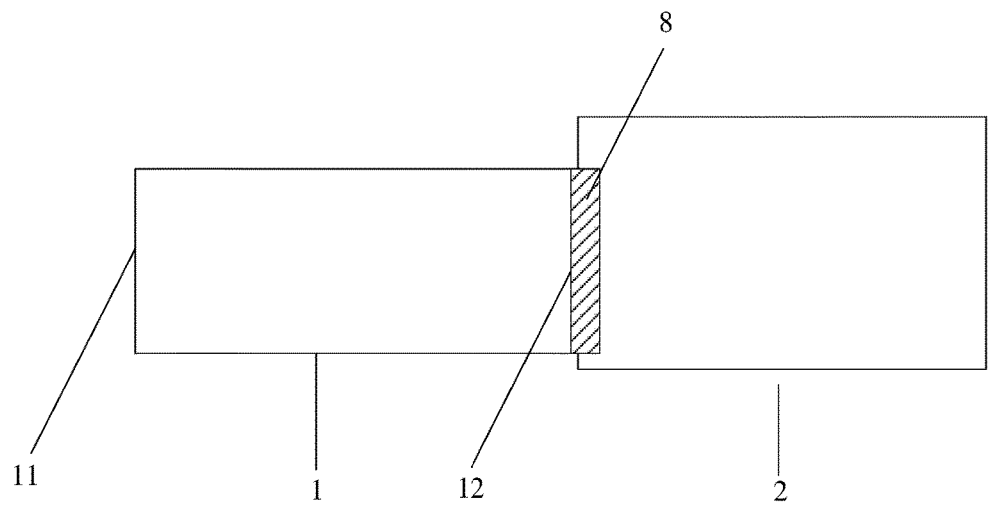
FIG. 3 is a schematic diagram of a turbine engine gas-inlet cooling system including an exhaust end, a silence, and an exhaust gas recovery device of a turbine engine provided by an embodiment of the present disclosure.

For example, as illustrated in FIG. 3, the turbine engine 1 comprises a muffler 8, and the muffler 8 is located at the gas-outlet end 12 of the turbine engine 1 and configured to reduce the noise generated by the exhaust gas of the turbine engine 1, and the exhaust gas recovery device 2 is provided at the muffler 8, so as to make the structure of the turbine engine gas-inlet cooling system 10 compact, which is beneficial to integrating the turbine engine gas-inlet cooling system 10 on one apparatus, avoiding the dependence on the inletting gas cooling operation in the factory, and expand the applicable scenarios of the turbine engine gas-inlet cooling system 10.

For example, as illustrated in FIG. 1, the turbine engine 1 comprises a working chamber 14 and a gas-inlet chamber 13. The gas-inlet chamber 13 comprises the gas-inlet end 11 of the turbine engine 1 and is connected to the working chamber 14. The gas-liquid heat exchange device 4 is arranged on the gas-inlet chamber 13, and the gas-outlet end of the gas-liquid heat exchange device 4 is connected to the gas-inlet chamber 13 to facilitate the disassembly of the gas-liquid heat exchange device 4, so that the structure of the turbine engine gas-inlet cooling system 10 is compact, which is beneficial to integrating the turbine engine gas-inlet cooling system 10 on one apparatus, avoiding the dependence on the inletting gas cooling operation in the factory, and expand the applicable scenarios of the turbine engine gas-inlet cooling system 10. The working gas enters the gas-inlet chamber 13 through the heat exchanger, and then enters the working chamber 14 of the turbine engine.

For example, the gas-liquid heat exchange device 4 is arranged on the top of the gas-inlet chamber 13 away from the ground, so that the gas output by the gas-liquid heat exchange device 4 enters the gas-inlet chamber 13 under the action of gravity, and the addition of gravity improves the gas transmission efficiency and reduce the transverse (a direction perpendicular to the ground or perpendicular to the gravity direction) size of the turbine engine apparatus adopting the turbine engine gas-inlet cooling system 10.

For example, the working chamber 14 of the turbine engine 1 comprises an air compressor and a combustion chamber. The air compressor is connected to the gas-inlet chamber 13, and the combustion chamber is connected to the air compressor. The working gas enters the air compressor first and after being compressed by the air compressor then enters the combustion chamber, and burns in the combustion chamber to make the turbine engine 1 do work.

Figure 4:
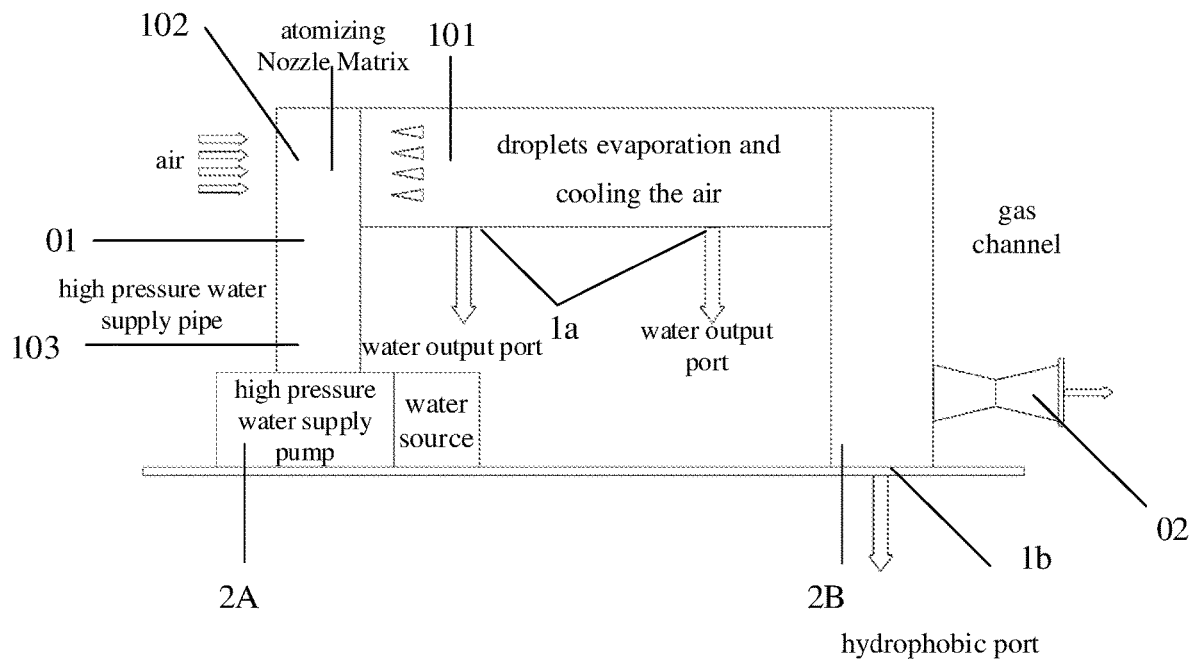
FIG. 4 is a schematic diagram of another turbine engine gas-inlet cooling system provided by an embodiment of the present disclosure.

FIG. 4 is a schematic diagram of another turbine engine gas-inlet cooling system provided by an embodiment of the present disclosure. The scheme illustrated in FIG. 4 uses a spray cooling method to cool the working gas supplied to the turbine engine. As illustrated in FIG. 4, the gas-inlet cooling device further comprises a liquid-inlet end 01 and comprises a cooling chamber 101 (for example, a gas-liquid processing chamber), an atomizer device 102 and a liquid supply pipeline 103. For example, the liquid supply pipeline 103 is a high pressure water supply pipeline. The working gas enters the cooling chamber 101 through the gas-inlet end 01; the atomizer device 102 is connected with the cooling chamber 101; the liquid supply pipeline 103 is connected with the atomizer device 102, and configured to transport liquid to the atomizer device 102; the atomizer device 102 is configured to atomize the liquid and allow the atomized product to enter the cooling chamber 101. For example, the atomized product is high-pressure water mist, and at the same time, the working gas, such as air, enters the cooling chamber 101 along with the high-pressure water mist, for example, high-pressure air is simultaneously input into the cooling chamber 101. The working gas is cooled by heat exchange between the working gas and the atomized product in the cooling chamber 101. In the cooling chamber 101, the volume of high-pressure water mist is changed, heat absorption occurs, so as to achieve the reduction of the air temperature. The liquid such as water, such as high-pressure desalinization, is conveyed to the atomizer device 102 through the liquid supply pipeline 103; the atomized product, for example, is water mist which comprises a large number of tiny water droplets. For example, the atomizer device 102 comprises multiple atomizing nozzles. For example, the working gas is dry air, and the high-pressure desalinated water is atomized through the nozzles. The atomized product is vaporized during the process of the working gas entering the cooling chamber 101, and the latent heat of vaporization is absorbed to reduce the temperature of the working gas, thus reducing the inlet temperature of the turbine engine supplied by the gas-outlet end 02 of the gas-exhaust cooling device.

As illustrated in FIG. 4, the turbine engine gas-inlet cooling system further comprises a gas-output pipeline 2B, the gas-output pipeline 2B is connected to the gas-output end of the cooling chamber 101 and serves as the gas-output end of the gas-inlet cooling device to be connected with the gas-inlet end of the turbine engine, for example, the gas-output pipeline 2B is connected with the gas-inlet end of the turbine engine through the gas-outlet end 02.

For example, as illustrated in FIG. 4, the turbine engine gas-inlet cooling system further comprises a liquid pump 2A (for example, a high-pressure liquid supply pump) and a liquid supply pipeline 103 (for example, a high-pressure water supply pipeline). Liquid supply device, for example, is a water supply device, and the liquid supply device is connected with the high-pressure liquid supply pump 2A, the high-pressure liquid supply pump 2A is connected with the liquid supply pipeline 103, and the water is pressured to a high pressure state by the high pressure liquid supply pump 2A. The liquid supply pipeline 103 is connected with the atomizer device 102. The high-pressure liquid supply pump 2A is configured to supply water from a water source to the atomizer device 102 through the liquid supply pipeline 103. During the working process of the turbine engine gas-inlet cooling system, the water supply to the atomizer device is continuous to ensure the continuous cooling of the working gas and the stability of the gas-inlet temperature supplied to the turbine engine.

For example, the temperature of the working gas after being cooled in the cooling chamber 101 is adjustable. For example, the turbine engine gas-inlet cooling system comprises a temperature control system configured to adjust the temperature of the working gas after the heat exchange in the cooling chamber 101. For example, a target temperature may be set in the temperature control system, and the temperature control system is configured to obtain the actual temperature of the working gas after being cooled in the cooling chamber 101, and compare the actual temperature with the target temperature; in the case where the actual temperature reaches the target temperature, the temperature control system controls the working gas to be output from the cooling chamber 101 so as to provide the working gas to the turbine engine; in the case where the actual temperature does not reach the target temperature, the temperature control system controls and adjusts the parameters of the atomizer device 102 such as the amount of atomization, the size of the atomized droplets, the density, the pressure of the high pressure air, etc. or adjusts the temperature and liquid volume of the liquid supplied to the atomizer device 102 to adjust the actual temperature of the working gas after being cooled in the cooling chamber 101. The air temperature can be quantitatively controlled for different seasons. Of course, the method of adjusting the temperature of the working gas after being cooled in the cooling chamber 101 is not limited to the above-mentioned method, which is not limited in the present disclosure, and can be designed by those skilled in the art according to the actual situation.

For example, the turbine engine gas-inlet cooling system illustrated in FIG. 4 may also comprise a liquid separator (not shown) which is configured to remove at least part of the liquid in the working gas cooled by heat exchange in the cooling chamber 101, to improve dryness of the working gas. For example, the liquid separator is a water separator gas. configured to remove at least part of the water in the working gas cooled by the heat exchange in the cooling chamber 101. Because in the process of gas-liquid heat exchange, the temperature of the working gas decreases, and the water vapor in the working gas changes from a gaseous state to a liquid state, but the working gas that is finally supplied to the turbine engine is required to be neat, clean, dry, and low-temperature air, therefore using the liquid separator to remove the water in the working gas can ensure the dryness of the working gas used by the turbine engine, so as to better meet the requirements of the turbine engine for the working gas and improve the combustion efficiency of the fuel in the turbine engine. For example, the liquid separator is arranged inside the cooling chamber 101, and the liquid separator absorbs at least part of the water in the working gas entering the cooling chamber 101 and discharges the water from the cooling chamber 101 to effectively increase the dryness of the working gas in the cooling chamber 101 in real time.

Figure 5:
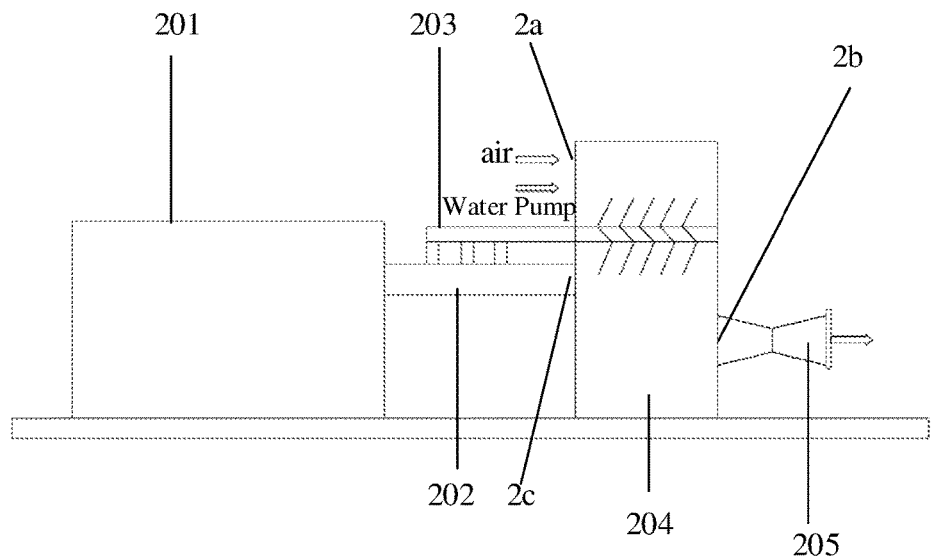
FIG. 5 is a schematic diagram of further another turbine engine gas-inlet cooling system provided by an embodiment of the present disclosure.

FIG. 5 is a schematic diagram of another turbine engine gas-inlet cooling system provided by an embodiment of the present disclosure. The scheme illustrated in FIG. 5 uses the gasification and heat absorption method of the liquefied natural gas (LNG) to cool the working gas supplied to the turbine engine. As illustrated in FIG. 5, for example, the turbine engine gas-inlet cooling system further comprises a liquefied natural gas gasification device 201, a gasification pipeline 202 and a cooling liquid transmission pipeline 203. The liquefied natural gas gasification device 201 is configured to gasify the liquefied natural gas; the gasification pipeline 202 is connected to the liquefied natural gas gasification device 201; the cooling liquid transmission pipeline 203 is connected to the gasification pipeline 202; the liquefied natural gas is gasified to cool the working liquid in the cooling liquid transmission pipeline 203; the gas-inlet cooling device comprises a gas-liquid heat exchange device 204, and the gas-liquid heat exchange device 204 comprises a gas-inlet end 2a, a gas-outlet end 2b and a liquid-inlet end 2c, and the gas-inlet end 2a is connected to the cooling liquid transmission pipeline 203, and the gas-inlet end 2a of gas-liquid heat exchange device 204 serves as the gas-input end of the gas-inlet cooling device, the working gas being input through the gas-inlet end of the gas-liquid heat exchange device 204 and the working liquid input through the liquid-inlet end 2c of the gas-liquid heat exchange device 204 conduct heat exchange in the gas-liquid heat exchange device 204, and, the gas-outlet end 2b of the gas-liquid heat exchange device 204 serves as the gas-output end of the gas-inlet cooling device and is connected to the gas-inlet end of the turbine engine. The cooling liquid is provided to the gas-liquid heat exchange device 204 by the cooling liquid transmission pipeline 203 through the liquid inlet end 2c, and the cooling liquid, for example is cooling water. For example, the cooling liquid delivered through the cooling liquid transmission pipeline 203 to the gas-liquid heat exchange device 204 is circulating. In the gasification process of the liquefied natural gas, a large amount of heat is absorbed, that is, a large amount of cold energy is released, and the cold energy is transferred to the cooling liquid transmission pipeline 203 through the gasification pipeline 202, thus reducing the temperature of the cooling liquid in the cooling liquid transmission pipeline 203, and the cooled liquid enters the gas-liquid heat exchange device 204 through the cooling liquid transmission pipeline 203. The working gas enters the gas-liquid heat exchange device 204 through the gas-inlet 2a of the gas-liquid heat exchange device 204, and the working gas and the cooling liquid exchange heat in the gas-liquid heat exchange device 204, so as to reduce the temperature of the working gas, and the cooled working gas is conveyed to the turbine engine through the gas-outlet end 2b of the gas-liquid heat exchange device 204. For example, the gas-inlet cooling device further comprises a gas-exhaust pipeline 205 connected with the gas-outlet end 2b of the gas-liquid heat exchange device 204 and the gas-inlet end of the turbine engine, and the cooled working gas is output from the gas-liquid heat exchange device 204. The gas-inlet cooling system is simple in structure, and makes full use of the cold energy released by the gasification of liquefied natural gas to cool the working gas, which can reduce the power consumption, the operation process of the gas-inlet cooling system is easy to be controlled and has high reliability.

For example, the gas-liquid heat exchange device 204 comprises a gasification skid; the gasification skid is, for example, an adjustable pressure type gasification skid or an adjustable temperature type gasification skid. Of course, the embodiments of the present disclosure does not limit the specific type of the gasification skid.

For example, the temperature of the working gas cooled in the gas-liquid heat exchange device 204 is adjustable. For example, the turbine engine gas-inlet cooling system comprises a temperature control system configured to regulate the temperature of the working gas after heat exchange in the gas-liquid heat exchange device 204. For example, a target temperature may be set in the temperature control system and the temperature control system is configured to obtain the actual temperature of the working gas cooled in the gas-liquid heat exchange device 204 and compare the actual temperature with the target temperature; in the case where the actual temperature reaches the target temperature, the temperature control system controls the working gas to be output from the gas-liquid heat exchange device 204, so as to supply the working gas to the turbine engine; in the case where the actual temperature does not reach the target temperature, the temperature control system adjusts the temperature of the cooling liquid in the cooling liquid transmission pipeline 203, the gasification amount and gasification rate of the liquefied natural gas, etc., so as to adjust the actual temperature of the working gas after being cooled in the gas-liquid heat exchange device 204. Of course, the method of adjusting the temperature of the working gas after being cooled in the gas-liquid heat exchange device 204 is not limited to the above method, and is not limited in this disclosure, those skilled in the art can design according to the actual situation.

For example, the turbine engine gas-inlet cooling system illustrated in FIG. 5 may further comprises a liquid separator (not shown), and the liquid separator is configured to remove at least part of the liquid in the working gas cooled by the heat exchange in the gas-liquid heat exchange device 204, so as to improve the dryness of the working gas. For details, reference may be made to the description of the water separator in FIG. 1, and are not repeated herein.

Figure 6:
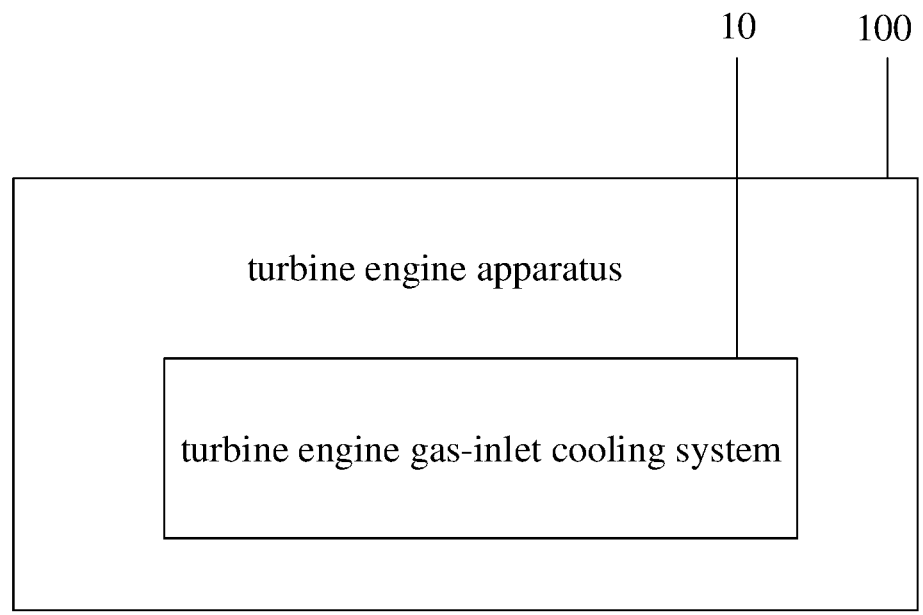
FIG. 6 is a schematic block diagram of a turbine engine apparatus provided by an embodiment of the present disclosure.

For example, as illustrated in FIG. 6, at least one embodiment of the present disclosure further provides a turbine engine apparatus 100, and the turbine engine apparatus 100 comprises any one of the turbine engine gas-inlet cooling systems 10 provided by the embodiments of the present disclosure, and the turbine engine apparatus 100 includes the gas-inlet end and the gas-outlet end thereof.

For example, the turbine engine apparatus comprises a main carrier, and the gas-inlet cooling device is arranged on the main carrier.

Figure 7:
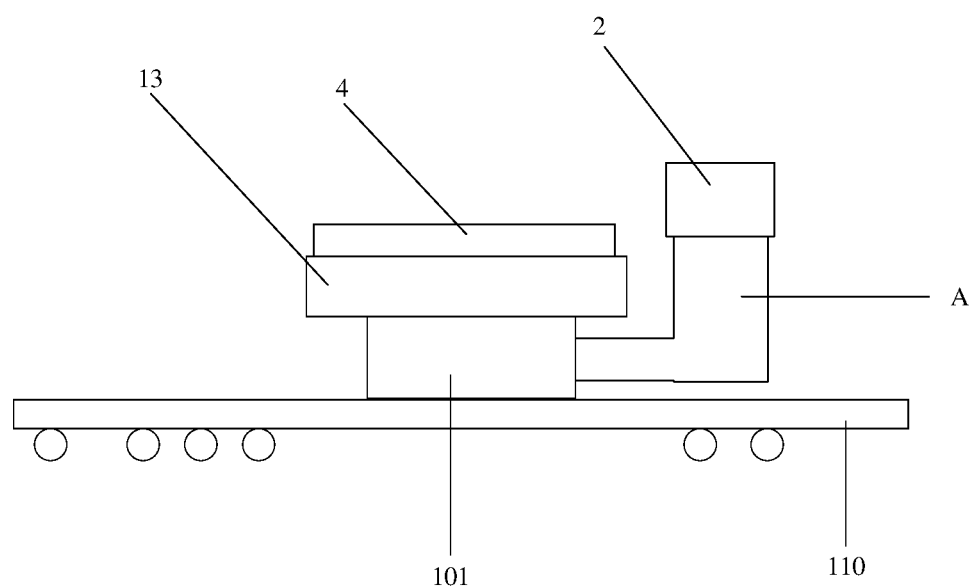
FIG. 7 is a schematic diagram of a turbine engine apparatus provided by an embodiment of the present disclosure.

For example, as illustrated in FIG. 7, in the case where the turbine engine apparatus 100 comprises the turbine engine gas-inlet cooling system 10 illustrated in FIG. 1, the turbine engine apparatus 100 comprises a main carrier 110, and the exhaust gas recovery device 2, a refrigeration device 3, and the gas-liquid heat exchange device 4 are all arranged on the main carrier 110, so as to integrate the turbine engine gas-inlet cooling system 10 on one apparatus, that is, to integrate the turbine engine gas-inlet cooling system 10 on the turbine engine apparatus 100, which can avoid the dependence on the inletting gas cooling operation in the factory, and expand the applicable scenarios of the turbine engine gas-inlet cooling system 10. The main carrier 110 may be, for example, a carrier plate or a carrier bracket, etc.

In other embodiments, for example, in the case where the turbine engine apparatus 100 comprises the turbine engine gas-inlet cooling system 10 illustrated in FIG. 4, the cooling chamber 101, the atomizer device 102, the liquid supply pipeline 103 and the liquid pump 2A are all integrated on the main carrier. For example, in the case where the turbine engine apparatus 100 comprises the turbine engine gas-inlet cooling system illustrated in FIG. 5, the liquefied natural gas gasification device 201, the gasification pipeline 202 and the cooling liquid transmission pipeline 203 are all integrated on the main carrier.

For example, the turbine engine apparatus 100 is a turbine fracturing apparatus (for example, a turbine fracturing vehicle) or a turbine power generation apparatus. Of course, the turbine engine apparatuses mentioned above are just two examples, and the embodiments of the present disclosure do not limit the type of the turbine engine apparatus 100, as long as it is a device adopting the turbine engine as a power source.

What have been described above are only specific implementations of the present disclosure, the protection scope of the present disclosure is not limited thereto. The protection scope of the present disclosure should be based on the protection scope of the claims.

What is claimed is:

1. An air-inlet cooling system of a turbine engine, wherein the turbine engine comprises an air-inlet end and an air-outlet end, and wherein the air-inlet cooling system comprises:
   a gasification pipeline, connected to a liquefied natural gas gasification device configured to gasify a liquefied natural gas to cool a working liquid in a cooling liquid transmission line connected to the gasification pipeline; and
   an air-inlet cooling device comprising:
      an air input end and an air output end, the air-inlet cooling device configured to cool a working air input from the air input end, wherein the air-output end is connected with the air-inlet end of the turbine engine; and
      an air-liquid heat exchange device comprising:
         an input serving as the air-input end of the air-inlet cooling device for inputting the working air into the air-liquid heat exchange device;
         a liquid-inlet end for inputting the working liquid from the cooling liquid transmission line into the air-liquid heat exchange device; and an output serving as the air-output end of the air-inlet cooling device for outputting the working air after heat exchange with the working liquid.

2. The air-inlet cooling system according to claim 1, wherein the air-inlet cooling system further comprises:
a first filter device, connected between the air-outlet end of the air-liquid heat exchange device and the air-inlet end of the turbine engine, and is configured to filter the working air discharged from the air-liquid heat exchange device.

3. The air-inlet cooling system according to claim 2, further comprising:
a second filter device, connected between the first filter device and the air-inlet end of the turbine engine, and configured to filter the working air discharged from the first filter device.

4. The air-inlet cooling system according to claim 3, wherein:
filtering precision of the second filter device is higher than that of the first filter device; and
purity of the working air after passing through the second filter device is higher than that of the working air after passing through the first filter device.

5. The air-inlet cooling system according to claim 1, wherein the turbine engine comprises:
a working chamber; and
an air-inlet chamber, comprising the air-inlet end of the turbine engine and is connected to the working chamber, wherein the air-liquid heat exchange device is arranged on the air-inlet chamber, and output of the air-liquid heat exchange device is connected to the air-inlet chamber.

6. The air-inlet cooling system according to claim 5, wherein the air-liquid heat exchange device is arranged on a top of the air-inlet chamber away from ground.

7. The air-inlet cooling system according to claim 5, wherein the working chamber of the turbine engine comprises:
an air compressor, connected to the air-inlet chamber; and
a combustion chamber, connected to the air compressor.

8. An air-inlet cooling system of a turbine engine, wherein the turbine engine comprises an air-inlet end and an air-outlet end, and the air-inlet cooling system comprises an air-inlet cooling device comprising:
an air-input end and an air-output end, the air-inlet device configured to cool a working air input from the air-input end, wherein the air-output end is connected with the air-inlet end of the turbine engine;
a cooling chamber, wherein the working air enters the cooling chamber through the air-inlet end;
an atomizer device, connected with the cooling chamber; and
a liquid supply pipeline which is connected with the atomizer device, and is configured to transport a liquid to the atomizer device, wherein the atomizer device is configured to atomize the liquid and allow an atomized liquid to enter the cooling chamber.

9. The air-inlet cooling system according to claim 8, further comprising:
a temperature control system, configured to regulate a temperature of the working air after heat exchange in the cooling chamber.

10. The air-inlet cooling system according to claim 8, further comprising:
a temperature control system, configured to regulate a temperature of the working air after heat exchange in the cooling chamber.

11. The air-inlet cooling system according to claim 8, further comprising:
a liquid separator, configured to remove at least part of liquid in the working air cooled by heat exchange in the cooling chamber.

12. A turbine engine apparatus, comprising the air-inlet cooling system according to claim 8, the air-inlet end and the air-outlet end.

13. The turbine engine apparatus according to claim 12, wherein the turbine engine apparatus further comprises a main carrier, and the air-inlet cooling device is arranged on the main carrier.

14. The turbine engine apparatus according to claim 13, wherein the turbine engine apparatus is a turbine fracturing apparatus or a turbine power generation apparatus.

15. The air-inlet cooling system according to claim 1, further comprising:
a temperature control system, configured to regulate a temperature of the working air after heat exchange in the air-liquid heat exchange device.

16. The air-inlet cooling system according to claim 1, further comprising:
a liquid separator, configured to remove at least part of liquid in the working air cooled by heat exchange in the air-liquid heat exchange device.

17. A turbine engine apparatus, comprising the air-inlet cooling system according to claim 1, the air-inlet end and the air-outlet end.

18. The turbine engine apparatus according to claim 17, wherein the turbine engine apparatus further comprises a main carrier, and the air-inlet cooling device is arranged on the main carrier.

19. The turbine engine apparatus according to claim 18, wherein the turbine engine apparatus is a turbine fracturing apparatus or a turbine power generation apparatus.

* * * * *